United States Patent
Agrawal (10) Patent No.: US 9,950,812 B2
(45) Date of Patent: Apr. 24, 2018

(54) SYSTEM AND METHOD FOR AIRSIDE ACTIVITY MANAGEMENT USING VIDEO ANALYTICS

(71) Applicant: AIRBUS GROUP INDIA PRIVATE LIMITED, Bangalore (IN)

(72) Inventor: Ashutosh Agrawal, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 257 days.

(21) Appl. No.: 14/813,152

(22) Filed: Jul. 30, 2015

(65) Prior Publication Data

US 2016/0039534 A1    Feb. 11, 2016

(30) Foreign Application Priority Data

Aug. 8, 2014  (IN) ............. 3906/CHE/2014

(51) Int. Cl.
- *B64D 47/08* (2006.01)
- *G06K 9/00* (2006.01)
- *G08G 5/00* (2006.01)
- *G08G 1/04* (2006.01)
- *G08G 7/00* (2006.01)
- *H04N 7/18* (2006.01)
- *G08G 5/06* (2006.01)

(52) U.S. Cl.
CPC ......... *B64D 47/08* (2013.01); *G06K 9/00771* (2013.01); *G06K 9/00785* (2013.01); *G08G 5/0026* (2013.01); *G08G 5/0082* (2013.01); *G08G 5/065* (2013.01); *G08G 7/00* (2013.01); *H04N 7/183* (2013.01); *G08G 1/04* (2013.01)

(58) Field of Classification Search
None
See application file for complete search history.

(56) References Cited

U.S. PATENT DOCUMENTS

| | | | |
|---|---|---|---|
| 2003/0067542 A1* | 4/2003 | Monroe | H04N 7/181 348/148 |
| 2003/0160708 A1* | 8/2003 | Knoop | G08G 5/0082 340/958 |
| 2007/0040063 A1* | 2/2007 | McCoskey | B64C 25/405 244/114 R |
| 2010/0002077 A1* | 1/2010 | Viggiano | G01S 13/867 348/115 |
| 2014/0085545 A1* | 3/2014 | Tu | G06K 9/00771 348/659 |
| 2014/0088857 A1* | 3/2014 | Hollin, Jr. | G10D 3/163 701/120 |
| 2015/0215899 A1* | 7/2015 | Kumar | H04W 72/02 455/59 |
| 2015/0217873 A1* | 8/2015 | Cox | B64F 1/225 414/800 |
| 2015/0221225 A1* | 8/2015 | Petersen | G06Q 10/04 701/120 |

* cited by examiner

*Primary Examiner* — Reza Aghevli
(74) *Attorney, Agent, or Firm* — Prakash Nama; Global IP Services, PLLC (57) ABSTRACT

A system and method for airside activity management using video analytics are disclosed. In one embodiment, video data of a survey area is obtained, in real time, from one or more video cameras. Further, time stamps associated with one or more airside activities of an aircraft from touchdown to takeoff are determined by applying video analytics on the obtained video data to manage the one or more airside activities.

24 Claims, 9 Drawing Sheets

SYSTEM AND METHOD FOR AIRSIDE ACTIVITY MANAGEMENT USING VIDEO ANALYTICS

RELATED APPLICATIONS

Benefit is claimed under 35 U.S.C. 119(a)-(d) to Foreign application Serial No. 3906/CHE/2014 filed in India entitled "SYSTEM AND METHOD FOR AIRSIDE ACTIVITY MANAGEMENT USING VIDEO ANALYTICS", filed on Aug. 8, 2014, by AIRBUS GROUP INDIA PRIVATE LIMITED, which is herein incorporated in its entirety by reference for all purposes.

TECHNICAL FIELD

Embodiments of the present subject matter generally relate to airside activities, and more particularly, to management of the airside activities using video analytics.

BACKGROUND

Typically, airline operators and/or ground handlers monitor airside activities from touchdown to takeoff of an aircraft for airside activity management. Exemplary airside activities include aircraft touchdown and takeoff, aircraft taxi and docking, aircraft arrival and departure at gate, ground vehicle movement, refueling and catering activities and the like. For managing the airside activities, the airline operators and/or ground handlers determine start and stop time stamps associated with the airside activities. Existing methods may rely on the start and stop time stamps determined by the airline operators and/or ground handlers for the airside activity management, gate allocation, TOBT computation, ground handling vehicle management and the like. However, manually determining the start and stop time stamps for the airside activities may not be accurate and results in inefficient management of airside activities and ground handling vehicles, unplanned gate allocation and inaccurate TOBT computation.

SUMMARY

A system and method for airside activity management using video analytics are disclosed. According to one aspect of the present subject matter, video data of a survey area is obtained, in real time, from one or more video cameras. Further, time stamps associated with one or more airside activities of an aircraft from touchdown to takeoff are determined by applying video analytics on the obtained video data to manage the one or more airside activities.

According to another aspect of the present subject matter, a system includes one or more video cameras and a computing system. Further, the computing system includes a video analytics tool to perform the method described above.

According to yet another aspect of the present subject matter, a non-transitory computer-readable storage medium for airside activity management using video analytics, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for airside activity management using video analytics re disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide methods and systems for airside activity management using video analytics. The example technique disclosed herein provides a video analytics tool for managing airside activities of an aircraft from touchdown to take off. Exemplary airside activities include ground handling activities (e.g., airport sky bridge movement, aircraft staircase movement, cargo activity, refueling activity and catering activity) and aircraft activities (e.g., aircraft touchdown and aircraft takeoff). In one embodiment, the video analytics tool obtains, in real time, video data from one or more video cameras mounted in a survey area (e.g., airside) of an airport. Further, the video analytics tool detects one or more airside activities and determines time stamps associated with the airside activities of an aircraft from touchdown to takeoff by applying video analytics on the obtained video data to manage the airside activities.

Figure 1:
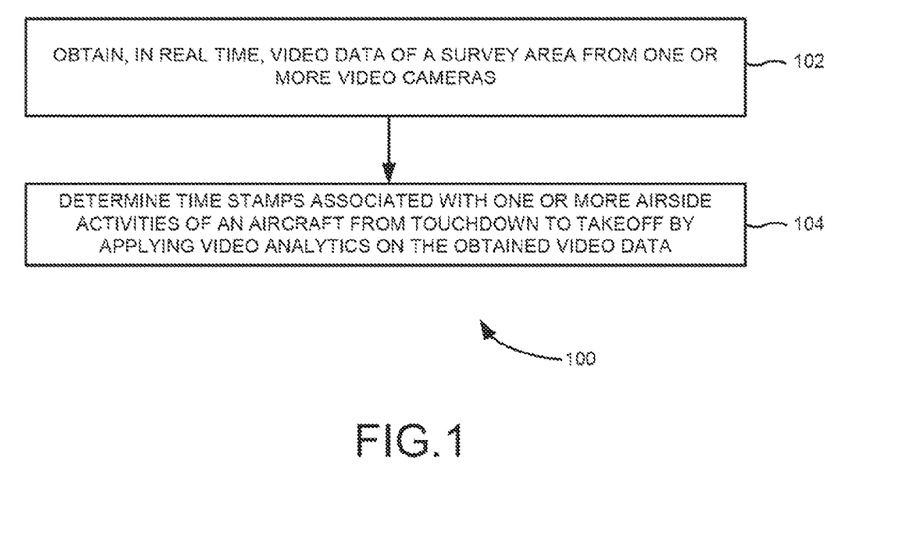
FIG. 1 is a flow diagram illustrating an exemplary method for airside activity management using video analytics, according to one embodiment.

Referring now FIG. 1, which is a flow diagram 100 illustrating an exemplary method for airside activity management using video analytics, according to one embodiment. At block 102, video data of a survey area is obtained, in real time, from one or more video cameras. For example, the one or more video cameras are arranged in the survey area of an airport such that the video cameras capture the video data of the aircraft from touchdown to takeoff.

At block 104, time stamps associated with one or more airside activities of an aircraft from touchdown to takeoff are determined by applying video analytics on the obtained video data to manage the one or more airside activities to manage the one or more airside activities. For example, airside activities include ground handling activities and aircraft activities. Exemplary ground handling activities include airport sky bridge movement, aircraft staircase movement, cargo activity, refueling activity, catering activity and the like. Exemplary aircraft activities include aircraft touchdown, aircraft takeoff and the like.

In one embodiment, the time stamps associated with one or more ground handling activities of an aircraft are obtained. In this embodiment, the aircraft and one or more ground handling vehicles are identified by applying video analytics on the obtained video data using images stored in an image database. Exemplary ground handling vehicles include a cargo van, a catering truck, a fuel truck, an airport sky bridge, an aircraft staircase and the like. For example, each of the one or more ground handling vehicles is associated with a ground handling activity.

Further in this embodiment, movements of one or more of the aircraft and the ground handling vehicles are tracked. In one example, a bounding box is created around the identified aircraft and each of the ground handling vehicles. Further, movements of the one or more of the aircraft and the ground handling vehicles are tracked using the created bounding boxes.

Furthermore in this embodiment, start and stop time stamps associated with one or more of the ground handling activities are determined based on distance between the aircraft and each of the ground handling vehicles. In one example, distance between a center of bounding box associated with the aircraft and a center of bounding box associated with each of the ground handling vehicles is determined. Further, start and stop time stamps associated with the one or more of the ground handling activities is determined based on the distance between the center of the bounding boxes associated with the aircraft and each of the ground handling vehicles.

In another embodiment, the time stamps associated with one or more aircraft activities are obtained. In this embodiment, the aircraft and a runway is identified by applying video analytics on the obtained video data, from landing to takeoff, using images stored in the image database. Further, a bounding box is created around the identified aircraft and the runway. Furthermore, movements of the identified aircraft are tracked using the created bounding box. In addition, distance between the bounding box associated with the aircraft and the bounding box associated with the runway is computed. Also, the time stamps associated with the aircraft touchdown and the aircraft takeoff are determined based on the computed distance.

Moreover in this embodiment, location information associated with the identified aircraft is determined based on the obtained video data. Further, a risk of collision of the aircraft in the identified runway is detected based on the determined location information and time stamps. Furthermore, an alert is issued, in real-time, in response to detecting the risk of collision of the aircraft. This is explained in detail with reference to FIG. 2.

Figure 2:
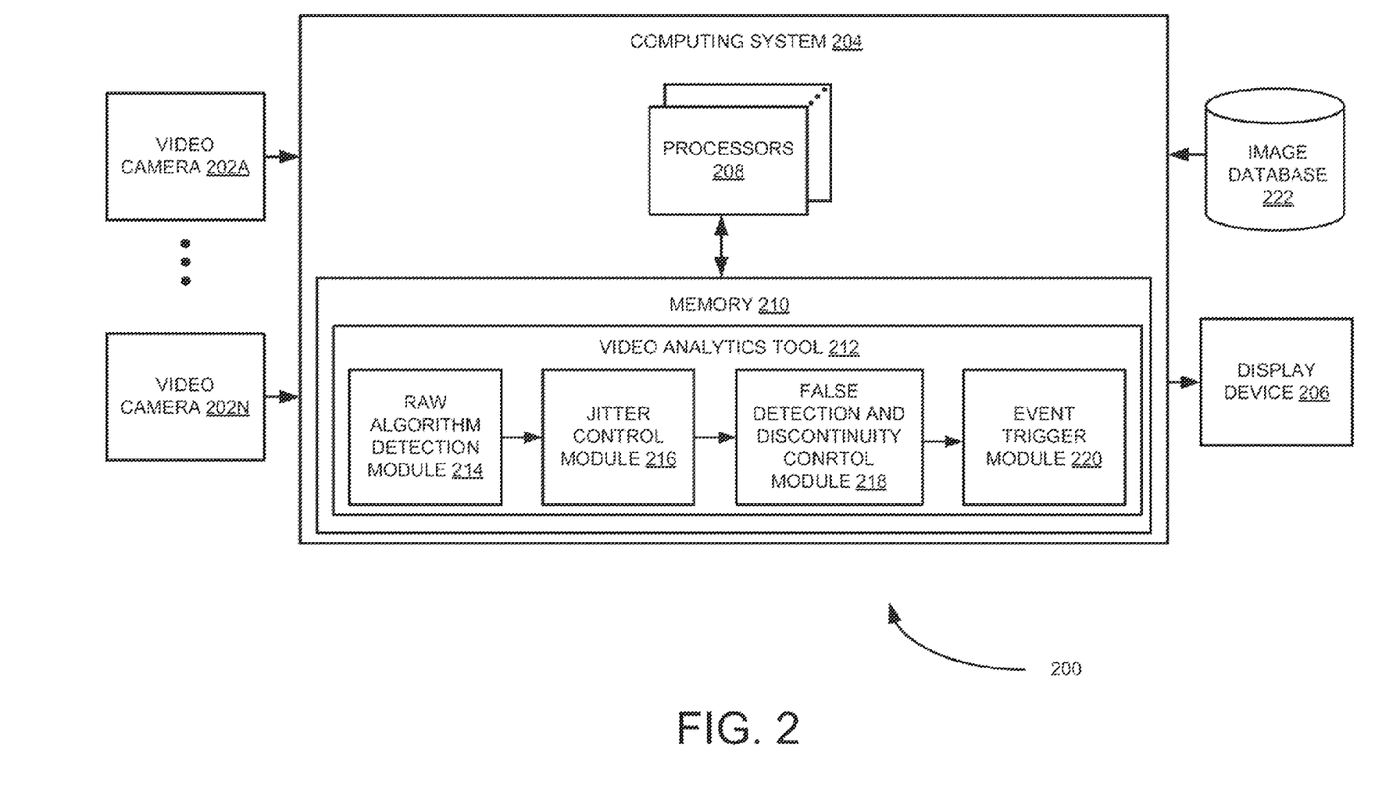
FIG. 2 is a block diagram illustrating an exemplary system for airside activity management using video analytics, according to one embodiment.

Referring now to FIG. 2, which is a block diagram illustrating an exemplary system 200 for airside activity management using video analytics, according to one embodiment. As shown in FIG. 2, the system 200 includes one or more video cameras 202A-N, a computing system 204, an image database 222 and a display device 206. Further as shown in FIG. 2, the computing system 204 includes one or more processors 208 and memory 210 coupled to the processors 208. Furthermore, the memory 210 includes a video analytics tool 212. In addition as shown in FIG. 2, the video analytics tool 212 includes a raw algorithm detection module 214, a jitter control module 216, a false detection and discontinuity control module 218 and an event trigger module 220.

In one example, the video cameras 202A-N are arranged in a survey area (e.g., an airside of the airport including apron areas, runways and so on) of an airport. Further, the video cameras 202A-N are communicatively connected to the computing system 204. For example, the computing system 204 may be a special purpose computing system or a general purpose computing system that is utilized to implement the video analytics tool 212. In this example, the computing system 204 may be present inside the airport. Further, the display device 206 is communicatively connected to the computing system 204. For example, the display device 206 can also be a part of the computing system 204.

Furthermore as shown in FIG. 2, the image database 222 is coupled to the computing system 204. In one example, the image database 222 includes a set of images associated with each of an aircraft, an aircraft staircase, an airport sky bridge, a fuel truck, a catering truck, a cargo van and so on. Exemplary set of images of the aircraft, the aircraft staircase, the airport sky bridge, the fuel truck, the catering truck and the cargo van are shown in FIGS. 3A to 3F, respectively.

In operation, the video cameras 202A-N capture, in real-time, video data of an aircraft from touchdown to takeoff. In one embodiment, the video cameras 202A-N capture video data of various airside activities of the aircraft from touchdown to takeoff. For example, the airside activities include ground handling activities and aircraft activities. Exemplary ground handling activities include airport sky bridge movement, aircraft staircase movement, cargo activity, refueling activity, catering activity and the like. Exemplary aircraft activities include aircraft touchdown, aircraft takeoff and the like.

Further in operation, the raw algorithm detection module 214 obtains the captured video data from the video cameras 202A-N. In one embodiment, the raw algorithm detection module 214 obtains video data from video cameras (e.g., some of the video cameras 202A-N) arranged in an apron area of the airport such that the video cameras capture video data of one or more ground handling activities of the aircraft.

Further, the raw algorithm detection module 214 identifies objects (e.g., the aircraft and one or more ground handling vehicles) in the obtained video data using the images stored in the image database 222. The ground handling vehicles may include a cargo van, a catering truck, a fuel truck, an airport sky bridge, an aircraft staircase and the like. In one example, each ground handling vehicle is associated with a ground handling activity. For example, the cargo van, the catering truck, the fuel truck, the airport sky bridge and the aircraft staircase are associated with the cargo activity, the catering activity, the refueling activity, the airport sky bridge movement and the aircraft staircase movement, respectively.

In one example implementation, the raw algorithm detection module 214 uses a machine learning algorithm to identify objects in the obtained video data. A machine learning algorithm is an algorithm that can be trained to identify objects in a video frame. Exemplary machine learning algorithm includes latent support vector machine (SVM) algorithm, haar algorithm, train-cascade algorithm and local binary partition (LBP) algorithm.

In one example, the machine learning algorithm includes an object identification model/classifier for each object. Each object identification classifier is programmed to identify an associated one of the objects in a video frame. For example, an object identification classifier for an aircraft is programmed, using the set of images of aircraft in the image database 222, to identify an aircraft based on distinguishing features of the aircraft, such as body of the aircraft, aircraft engines, aircraft wings and so on.

Figure 4A:
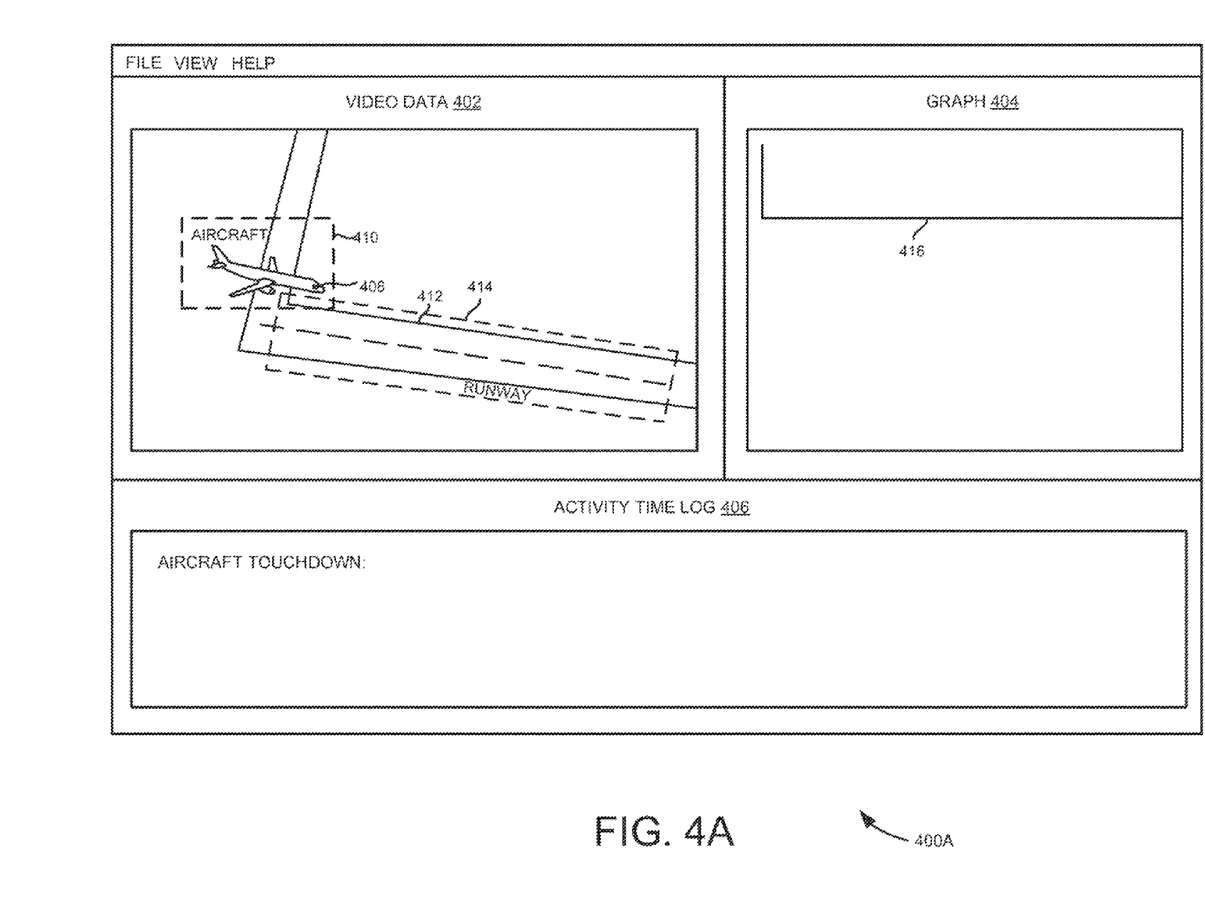
FIGS. 4A to 4C illustrate screen shots depicting bounding boxes and time stamps for each airside activity in a captured video frame, according to one embodiment.
Figure 4B:
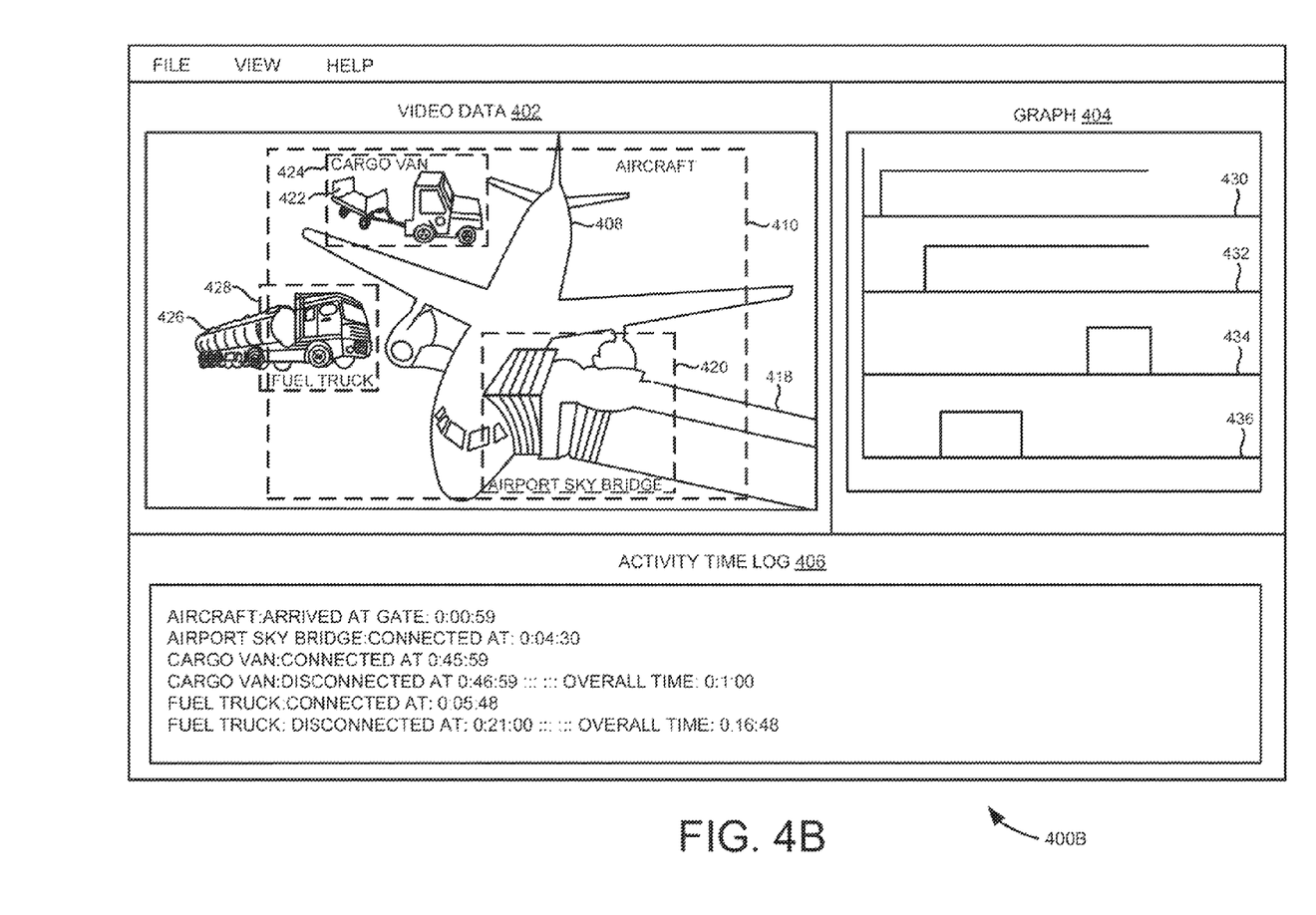
Figure 4C:
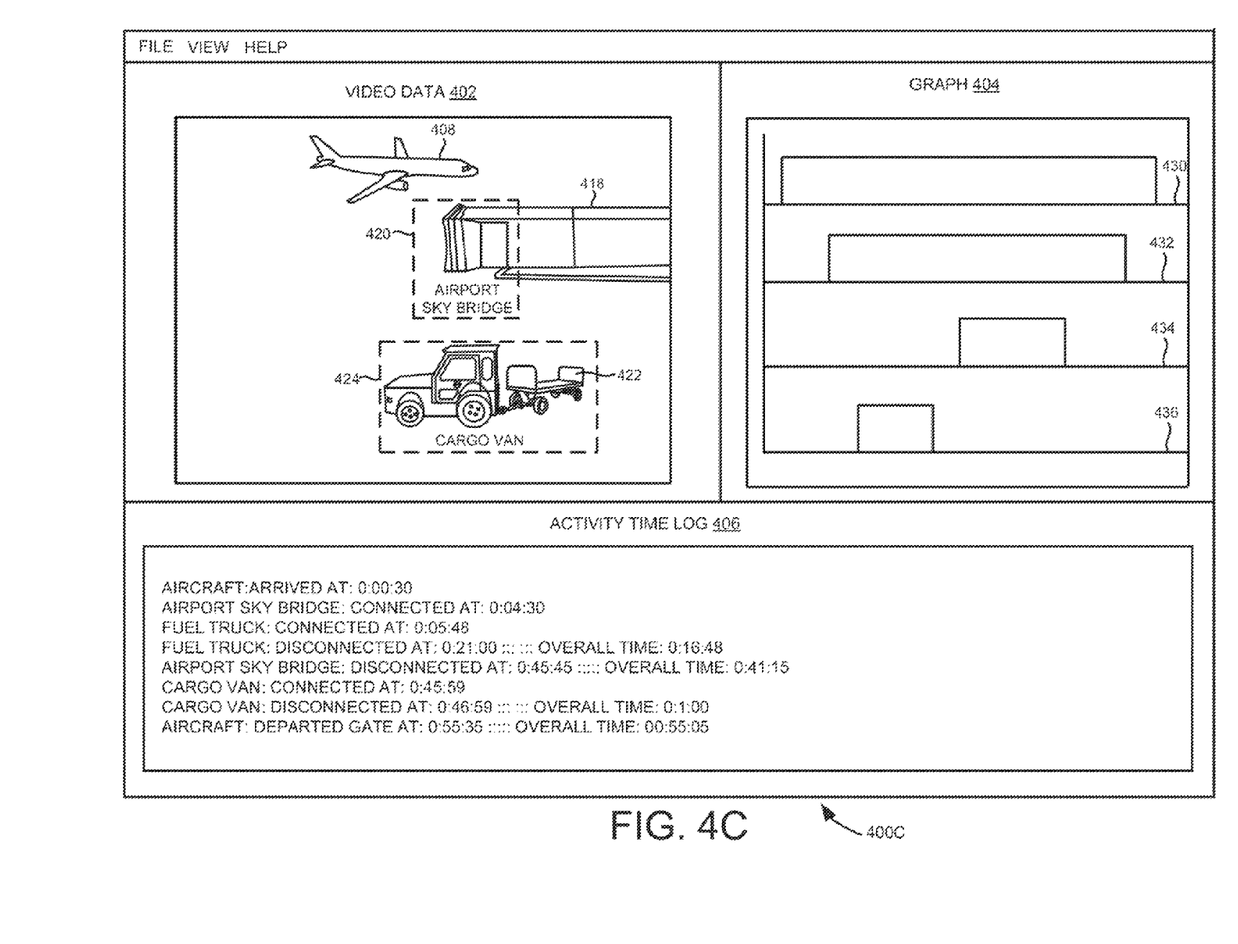

Furthermore in this embodiment, the raw algorithm detection module 214 creates a bounding box around each of the identified objects in each video frame in the obtained video data. For example, each bounding box encloses an associated one of the objects. Exemplary bounding boxes enclosing objects identified in a video frame is shown in FIGS. 4A-4C. In addition, the raw algorithm detection module 214 tracks movements of the identified objects in the obtained video data using the created bounding boxes. For example, when an object in the obtained video data moves, the location and size of the bounding box associated with the object changes accordingly.

In one example, location and size of the bounding boxes may vary slightly, in each video frame, even when the objects enclosed within the bounding boxes are stationary. This variation in location and size of the bounding boxes when the associated objects are stationary is referred to as jitter. In the presence of jitter, the movement of the objects enclosed in the bounding boxes may not be tracked efficiently as the location and size of the bounding boxes are constantly varying.

In one embodiment, the jitter control module 216 reduces any jitter associated with the bounding boxes. The jitter control module 216 ensures that location and size of a bounding box do not change when an object enclosed in the bounding box is stationary. Further, the jitter control module 216 ensures that the location and size of the bounding box change when the object enclosed in the bounding box moves.

In one example, the jitter control module 216 uses a sample and hold technique to reduce the jitter associated with the bounding boxes. In this technique, the jitter control module 216 compares location and size of a bounding box in a current video frame with location and size of the corresponding bounding box in a previous video frame. If the change in location and size of the bounding box is less than a predefined threshold value (say, 10%), then the object enclosed in the bounding box is considered to be stationary and the location and size of bounding box in the previous video frame is retained by the jitter control module 216. If the bounding box in the current video frame is enclosed in the corresponding bounding box in the previous video frame and the change in size is not more than a predefined threshold value (say, 20%), then the object enclosed in the bounding box is considered to be stationary and the location and size of bounding box in the previous video frame is retained by the jitter control module 216. If the bounding box in the previous video frame is enclosed in the corresponding bounding box in the current video frame and the change in size is not more than a predefined threshold value (say, 20%), then the object enclosed in the bounding box is considered to be stationary and the location and size of bounding box in the current video frame is retained by the jitter control module 216. If the change in location and size of the bounding box is more than a predefined threshold value (say, 20%), then the object enclosed in the bounding box is considered to have moved and therefore the location and size of bounding box in the current video frame is retained by the jitter control module 216.

Upon reducing the jitter associated with the bounding boxes, the false detection and discontinuity control module 218 assigns a confidence value for each of the identified objects in the obtained video data. The confidence value associated with an object indicates a number of video frames in which the object is identified in the obtained video data. In one example, when an object is identified for the first time, at location A, the confidence value associated with the object is set to zero. Further, the confidence value associated with the object will be incremented by one for every subsequent video frame in which the object is identified at the location A. Furthermore, when the object moves from the location A to a location B (such that, the bounding box associated with the object at location A and location B overlap with each other), the confidence value associated with the object is reduced by half. In one example, the false detection and discontinuity control module 218 uses the confidence value associated with the objects to eliminate any false detection of objects in the obtained video and also to eliminate discontinuity of any identified objects in the obtained video data.

In one example scenario, consider an object (say, a catering van) is identified, by the raw algorithm detection module 214, in the obtained video data for, say, 10 consecutive video frames. After the 10 video frames, if the catering van is not identified in a current video frame, then a confidence value associated with the catering van in the previous video frame is retained. If the confidence value associated with the catering van is below a predefined threshold confidence value, then the false detection and discontinuity control module 218 considers that the catering van was falsely identified. If the confidence value associated with the catering van is above the predefined threshold confidence value, then the false detection and discontinuity control module 218 considers that the catering van is identified in the current video frame.

In another example scenario, consider an object (say, the aircraft) is identified, by the raw algorithm detection module 214, in the obtained video data for say, 30 consecutive video frames. After the 30 video frames, if the aircraft is not identified in a current video frame (for e.g., the aircraft may not be identified as most parts of the aircraft is obstructed by ground handling vehicles), then the confidence value associated with the aircraft in the previous video frame is retained. If the confidence value associated with the aircraft in the previous video frame is above the predefined threshold confidence value, then the false detection and discontinuity control module 218 considers that the aircraft is identified in the current video frame. In other words, even though the aircraft is not identified by the raw algorithm detection module 214, the false detection and discontinuity control module 218 considers that the aircraft is identified in the video frames until the aircraft is detected again and the confidence value associated with the aircraft starts to increase.

Upon identifying the objects in the obtained video data, the event trigger module 220 determines time stamps associated with one or more ground handling activities of the aircraft based on the identified objects. For example, the time stamps include start and stop time stamps associated with each ground handling activity or connection and disconnection time stamps associated with each ground handling vehicles. In one embodiment, the event trigger module 220 determines the time stamps associated with the ground handling activities based on distance between the centre of bounding boxes associated with the aircraft and each of the ground handling vehicles. In one example, when the distance between the centre of the bounding boxes associated with the aircraft and one of the ground handling vehicles is less than a predefined threshold minimum distance, the ground handling vehicle is said to be connected to the aircraft. The time at which the ground handling vehicle connects to the aircraft indicates the start time of a ground handling activity associated with the ground handling vehicle.

In one example, after a ground handling vehicle is connected to the aircraft, if it is identified that the ground handling vehicle has moved closer to the aircraft, within a predefined threshold time value (say, 5 minutes), then, the start time of the ground handling activity associated with the ground handling vehicle is revised to the time when the ground handling vehicle moved closer to the aircraft.

Further, when the distance between the centre of the aircraft and the ground handling vehicle starts to increase, the ground handling vehicle is considered to have disconnected from the aircraft. The time at which the ground handling vehicle disconnects from the aircraft indicates the stop time of the ground handling activity associated with the ground handling vehicle. Similarly, the start and stop time stamps are determined for each of the ground handling activities of the aircraft.

In another embodiment, time stamps associated with the aircraft activities, such as aircraft touchdown and aircraft takeoff are determined by the video analytics tool 212. In one example, the raw algorithm detection module 214 obtains video data, in real-time, from video cameras (e.g., some of the video cameras 202A-N) arranged such that the video cameras capture video data of the aircraft activities. Further, the raw algorithm detection module 214 identifies the aircraft approaching/departing a runway using the machine learning algorithm using images stored in the image database 222. In this embodiment, the machine learning algorithm includes object identification classifiers for the aircraft and the runway. For example, an object identification classifier for a runway is programmed, using the set of images of runway, to identify a runway based on distinguishing features of the runway, such as markings on the runway and so on.

Furthermore, the raw algorithm detection module 214 creates a bounding box around the identified aircraft and the runway. Exemplary bounding box created around an aircraft and a runway are shown in FIG. 4A. In addition, movements of the identified aircraft are tracked using the created bounding box. Also, the jitter control module 216 reduces any jitter associated with the bounding boxes of the aircraft and the runway using the sample and hold technique. Moreover, the false detection and discontinuity control module 218 assigns a confidence value to the aircraft and the runway.

In addition, the event trigger module 220 computes distance between the bounding box associated with the aircraft and the bounding box associated with the runway. Further, the event trigger module 220 determines the time stamps associated with the aircraft activities based on the computed distance.

In one example, when the aircraft is approaching the runway, the event trigger module 220 determines time stamp associated with aircraft touchdown when the distance between the bounding boxes associated with the aircraft and the runway is below a predefined threshold value. In other words, the event trigger module 220 determines time stamp associated with aircraft touchdown when the distance between the centre of the bounding box associated with the aircraft and a centre line along length of the bounding box associated with the runway are within the predefined threshold value. Further, the event trigger module 220 determines time stamp associated with aircraft takeoff when the distance between the bounding boxes associated with the aircraft and the runway start to increase.

In this example, the video analytics tool 212 determines occurrence of a runway incursion. For example, occurrence of a runway incursion may be determined by detecting presence of other aircraft, vehicle (e.g., ground handling vehicle) or person on a runway designated for landing or take-off of the aircraft. In one example, location information of aircraft approaching or departing a runway is determined using the obtained video data. Further, the obtained video data is monitored for identifying any other aircraft, vehicle and/or person approaching the runway. Furthermore, location information associated with the identified other aircraft, vehicle and/or person approaching the runway is determined. In addition, distance between the aircraft and the other aircraft, vehicle and/or person approaching the runway is determined based on the determined location information. For example, the distance may be determined by tagging global positioning system (GPS) coordinates to specific pixels in a video frame. In addition, a risk of collision of the aircraft in the runway is detected based on the determined distance. Also, the event trigger module 220 issues an alert, in real-time, in response to detecting the risk of collision of the aircraft.

Similarly, time stamps associated with other aircraft activities, such as aircraft arrival at gate and aircraft departure at gate may also be determined using the video analytics tool 212. In one example, the raw algorithm detection module 214 obtains video data, in real-time, from video cameras (e.g., some of the video cameras 202A-N) arranged such that the video cameras capture video data of the apron area in the airport. Further, the raw algorithm detection module 214 identifies the aircraft entering the apron area using the images stored in the image database 222. Furthermore, movements of the aircraft are tracked using a bounding box associated with the aircraft. In one example, the event trigger module 220 determines the time of aircraft arrival at gate when the aircraft stops moving (the aircraft is docked) in the apron area. Further, the event trigger module 220 determines the time of aircraft departure at gate when the aircraft starts moving in the apron area after completion of the ground handling activities of the aircraft.

In one example embodiment, the event trigger module 220 determines aircraft taxi-in and taxi-out times using the determined time stamps associated with aircraft touchdown, aircraft arrival at gate, aircraft departure at gate and the aircraft takeoff. The aircraft taxi-in time is the difference between the time stamps associated with aircraft arrival at gate and aircraft touchdown. The aircraft taxi-out time is the difference between the time stamps associated with aircraft departure at gate and aircraft takeoff.

In one example, the determined time stamps for each of the airside activities may be displayed on the display device 206. In one embodiment, the airline operators and/or ground handlers utilize these time stamps to effectively manage (e.g., schedule) the airside activities. The airside activity management includes monitoring the usage of each of the ground handling vehicles, monitoring usage of the gate in which the aircraft is docked, computing target off block time (TOBT) using the determined time stamps, gate allocation and the like.

Referring now to FIGS. 3A to 3F, which illustrate exemplary sets of images (also referred to as positive images) of an aircraft, an aircraft staircase, an airport sky bridge, a fuel truck, a catering truck and a cargo van, respectively, in different orientations, in the context of the present invention. The set of images of each of the aircraft, the aircraft staircase, the airport sky bridge, the fuel truck, the catering truck and the cargo van are stored in the image database 222, shown in FIG. 2. These sets of images are used to program associated object identification classifiers in the machine learning algorithm. This is explained in detail with reference to FIG. 2.

Figure 3A:
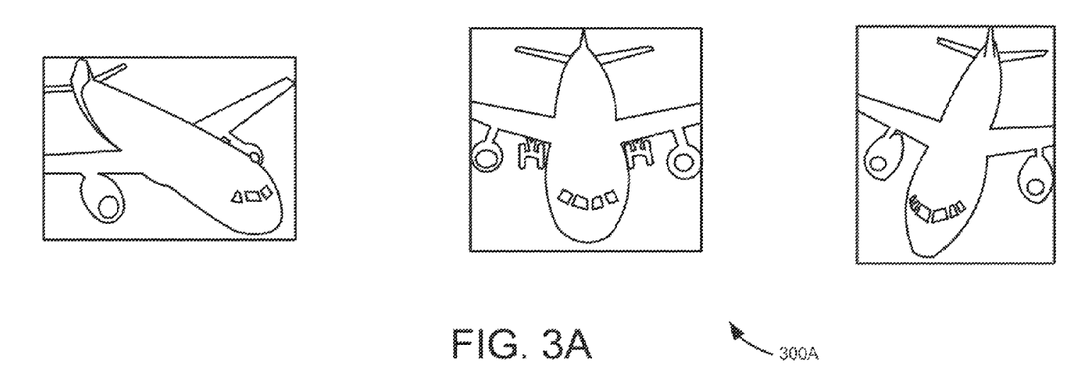
FIGS. 3A to 3F illustrate exemplary set of images of an aircraft, an aircraft staircase, an airport sky bridge, a fuel truck, a catering truck and a cargo van, respectively, in different orientations, in the context of the present invention.

Now, referring to FIG. 3A which illustrates an exemplary set of images of aircraft in different orientations. The images include distinguishing features of an aircraft, such as aircraft body, aircraft engines, aircraft wings and so on. Further, an object identification classifier is programmed, using the set of images of aircraft, to identify an aircraft in an obtained video frame based on the distinguishing features of the aircraft.

Figure 3B:
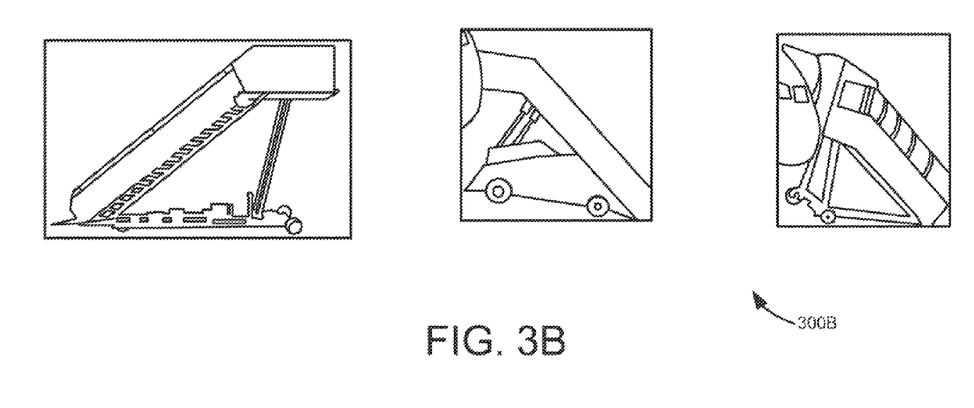

Now, referring to FIG. 3B which illustrates an exemplary set of images of aircraft staircase in different orientations. The images include distinguishing features of an aircraft staircase, such as a triangular staircase stand, stairs and so on. Further, an object identification classifier is programmed, using the set of images of aircraft staircase, to identify an aircraft staircase in an obtained video frame based on the distinguishing features of the aircraft staircase.

Figure 3C:
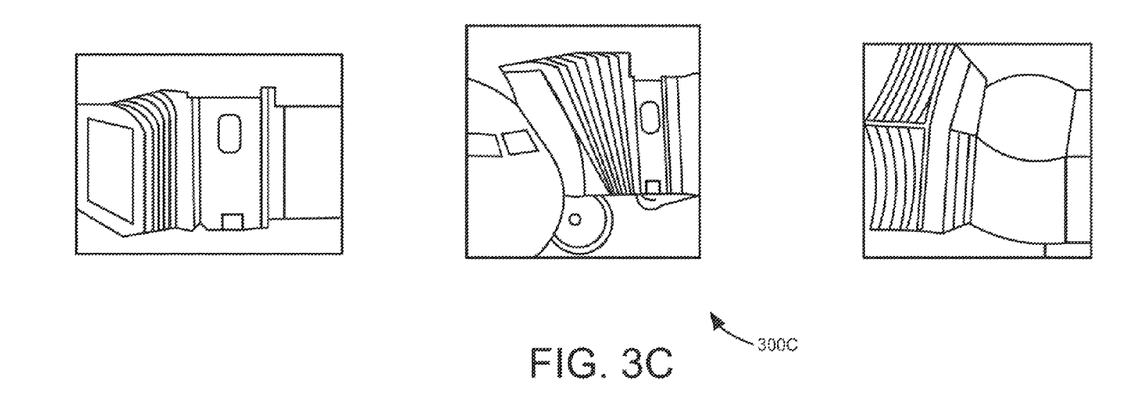

Now, referring to FIG. 3C which illustrates exemplary set of images of airport sky bridge in different orientations. The images include distinguishing features of an airport sky bridge, such as the terminal end of the airport sky bridge. Further, an object identification classifier is programmed, using the set of images of airport sky bridge, to identify an airport sky bridge in an obtained video frame based on the distinguishing features of the airport sky bridge.

Figure 3D:
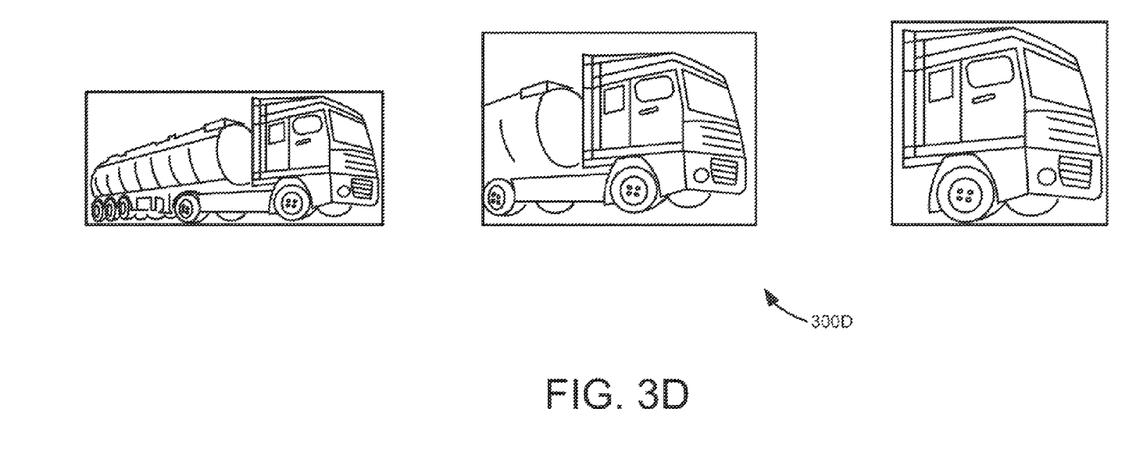

Now, referring to FIG. 3D which illustrates exemplary set of images of fuel truck in different orientations. The images include distinguishing features of a fuel truck, such as front end of the fuel truck and part of a fuel tank connected to the front end of the fuel truck. Further, an object identification classifier is programmed, using the set of images of fuel truck, to identify a fuel truck in an obtained video frame based on the distinguishing features of the fuel truck.

Figure 3E:
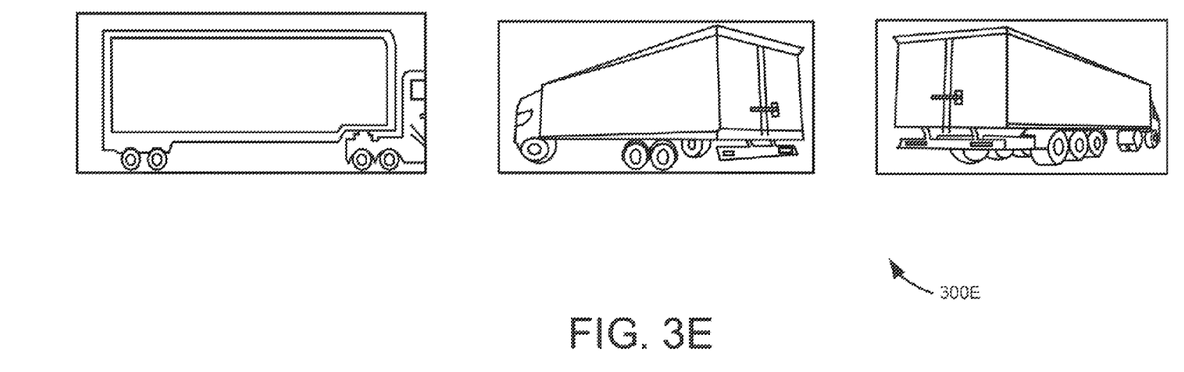

Now, referring to FIG. 3E which illustrates exemplary set of images of catering van in different orientations. The images include distinguishing features of a catering van, such as a container of the catering van. Further, an object identification classifier is programmed, using the set of images of catering van, to identify a catering van in an obtained video frame based on the distinguishing features of the catering van.

Figure 3F:
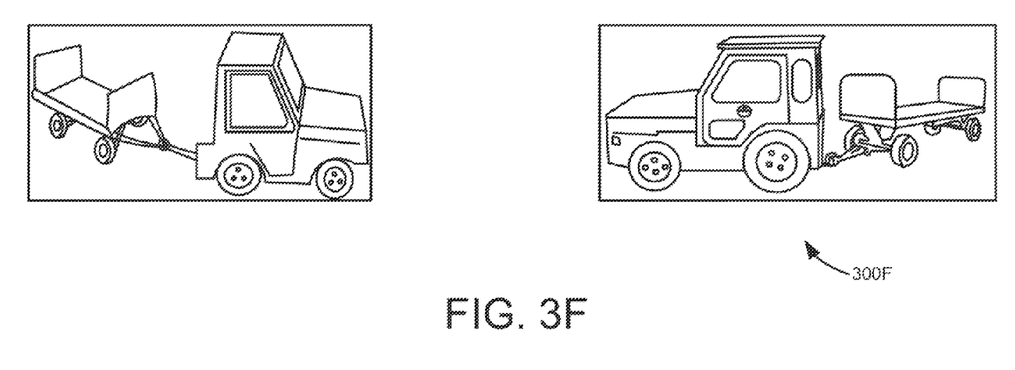

Now, referring to FIG. 3F which illustrates exemplary set of images of cargo van in different orientations. The images include distinguishing features of a cargo van, such as a driving van and a first trailing trolley. Further, an object identification classifier is programmed, using the set of images of cargo van, to identify a cargo van in an obtained video frame based on the distinguishing features of the cargo van.

In one example, negative images may also be used along with the positive images of each of the objects to program the object identification classifiers. The negative images are used to reduce false detections of objects with similar features in a video frame. For example, an angled ground marking may be detected as aircraft staircase due to the triangular feature of the aircraft staircase. Therefore, an image of the ground marking may be stored as a negative image of aircraft staircase to avoid its detection.

Referring now to FIGS. 4A to 4C, which illustrate screen shots 400A-C depicting bounding boxes and time stamps for each airside activity in a captured video frame, according to one embodiment. Particularly, the screen shots depict video data 402, a graph 404 and an activity time log 406. As shown in the FIGS. 4A to 4C, the video data 402 includes bounding boxes around each object (e.g., aircraft, ground handling vehicles and runway) identified in the captured video frame.

Further as shown in the FIGS. 4A to 4C, the graph 404 includes graphical representations of the time stamps associated with each airside activity. In the graph, the x-axis indicates time. In the examples illustrated in FIGS. 4A to 4C, a connection of a ground handling vehicle (or start of a ground handling activity associated with the ground handling vehicle) is represented by a state change from low to high and a disconnection of a ground handling vehicle (or stop of a ground handling activity associated with the ground handling vehicle) is represented by a state change from high to low. For example, the graphs may be color coded such that color of a bounding box enclosing an object is same as the color of the graph representing an airside activity associated with the object. Furthermore as shown in the FIGS. 4A to 4C, the activity time log 406 includes time stamps (start and stop or connection and disconnection time stamps) associated with airside activities in the captured video frame in textual format.

Now, referring to FIG. 4A, the screen shot 400A depicts a captured video frame of an aircraft 408 approaching a runway 412. As shown in FIG. 4A, a bounding box 410 encloses the aircraft 408 and a bounding box 414 encloses the runway 4012. Further as shown in FIG. 4A, 416 is a graph which will indicate the aircraft touchdown time. Furthermore as shown in FIG. 4A, the activity time log 406 will include the time stamp associated with aircraft touchdown after the aircraft lands on the runway. In the example illustrated in FIG. 4A, the aircraft 408 is about to land on the runway 412, therefore, time stamp associated with aircraft touchdown is yet to be determined.

Now, referring to FIG. 4B, the screen shot 400B depicts a captured video frame including the aircraft 408, an airport sky bridge 418, a cargo van 422 and a fuel truck 426. For example, the video frame is obtained from a video camera arranged in the apron area in the airport. As shown in FIG. 4B, a bounding box 410 encloses the aircraft 408, a bounding box 420 encloses the airport sky bridge 418, a bounding box 424 encloses the cargo van 422, and a bounding box 428 encloses the fuel truck 426. Further as shown in FIG. 4B, the activity time log 406 includes time stamps associated with ground handling activities associated with each of the airport sky bridge 418, the cargo van 422 and the fuel truck 426. In the example illustrated in FIG. 4B, time stamps associated with aircraft arrival, airport sky bridge connection, cargo van connection and disconnection and fuel truck connection and disconnection are depicted. Furthermore as shown in FIG. 4B, 430 is a graph indicating time stamp associated with aircraft arrival at gate, 432 is a graph indicating time stamp associated with airport sky bridge connection, 434 is a graph indicating time stamp associated with cargo van connection and disconnection and 436 is a graph indicating time stamp associated with fuel truck connection and disconnection.

Now, referring to FIG. 4C, the screen shot 400C depicts a captured video frame including the aircraft 408, an airport sky bridge 418 and a cargo van 422. For example, the video frame is obtained, from a video camera arranged in the apron area in the airport. In the example illustrated in FIG. 4C, the aircraft 408 has departed from gate. As shown in FIG. 4C, the bounding box 420 encloses the airport sky bridge 418 and the bounding box 424 encloses the cargo van 422. Further as shown in FIG. 4C, the activity time log 406 includes time stamps associated with aircraft arrival at gate, airport sky bridge connection and disconnection, cargo van connection and disconnection, fuel truck connection and disconnection and aircraft departure at gate. Furthermore as shown in FIG. 4C, 430 is a graph indicating time stamp associated with aircraft arrival at gate and aircraft departure at gate, 432 is a graph indicating time stamp associated with airport sky bridge connection and disconnection, 434 is a graph indicating time stamp associated with cargo van connection and disconnection and 436 is a graph indicating time stamp associated with fuel truck connection and disconnection.

Figure 5:
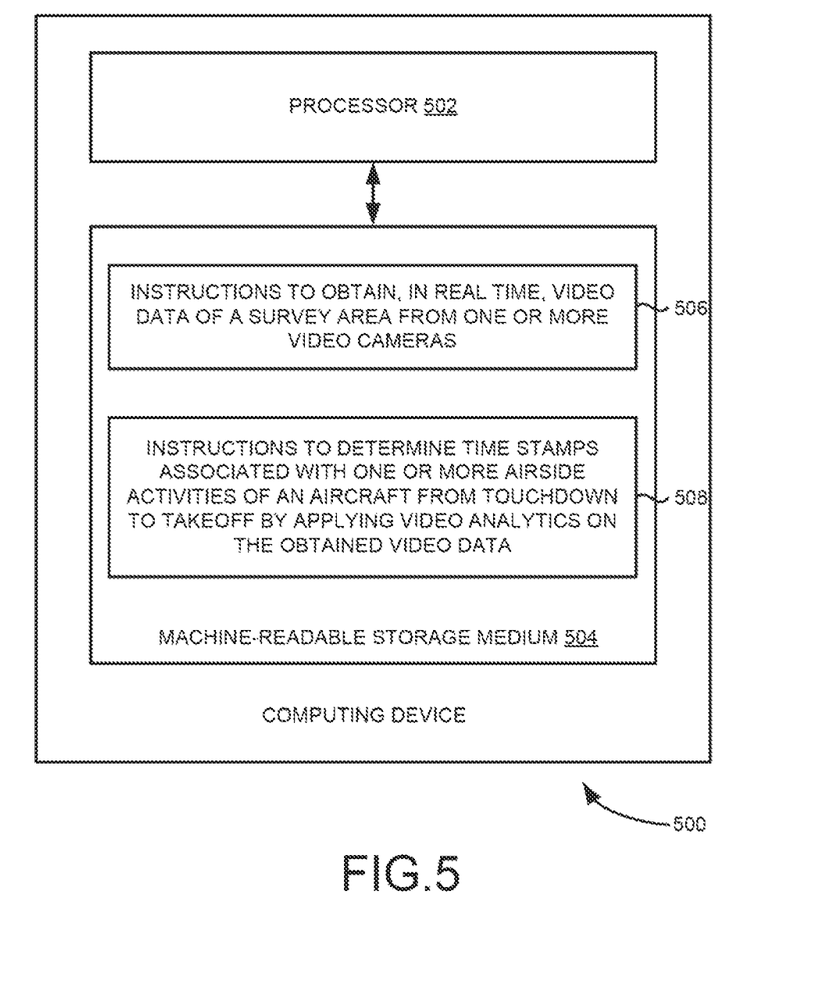
FIG. 5 is a block diagram of a computing device for managing airside activities using video analytics, according to one embodiment.

Referring now to FIG. 5, which illustrates a block diagram of an example computing device 500 for managing airside activities using video analytics. The computing device 500 includes a processor 502 and a machine-readable storage medium 504 communicatively coupled through a system bus. In an example, the computing device 500 may be analogous to the computing system 204 of FIG. 2. The processor 502 may be any type of a central processing unit (CPU), a microprocessor, or processing logic that interprets and executes machine-readable instructions stored in the machine-readable storage medium 504. The machine-readable storage medium 504 may be a random access memory (RAM) or another type of dynamic storage device that may store information and machine-readable instructions that may be executed by the processor 502. For example, the machine-readable storage medium 504 may be synchronous DRAM (SDRAM), double data rate (DDR), rambus DRAM (RDRAM), rambus RAM, etc. or a storage memory media such as a floppy disk, a hard disk, a CD-ROM, a DVD, a pen drive, and the like. In an example, the machine-readable storage medium 504 may be a non-transitory computer-readable storage medium. The machine-readable storage medium 504 may store instructions 506 and 508. In an example, the instructions 506 may be executed by the processor 502 to obtain, in real time, video data of a survey area from at least one video camera. The instructions 508 may be executed by the processor 502 to determine time stamps associated with one or more airside activities of an aircraft from touchdown to takeoff by applying video analytics on the obtained video data. The airside activities include ground handling activities and aircraft activities. Exemplary ground handling activities include airport sky bridge movement, aircraft staircase movement, cargo activity, refueling activity and catering activity. Exemplary aircraft activities include aircraft touchdown and aircraft takeoff.

In various embodiments, the systems and methods described in FIGS. 1 through 5, propose a technique for managing airside activities using video analytics. The proposed technique determines time stamps associated with airside activities by applying video analytics on captured video data. The time stamps determined herein are reliable, thus reducing dependency on subjective data from airline operators and ground handlers for airside activity management. Further, the determined time stamps may be used for computing accurate TOBT and for managing gate allocation. Also, the proposed technique detects risk of collision of an aircraft on a runway and provides alerts in response to detecting the risk of collision.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for airside activity management using video analytics, comprising:
   obtaining, in real time, video data of a survey area from at least one video camera; and
   determining time stamps associated with one or more airside activities of an aircraft from touchdown to takeoff by applying video analytics on the obtained video data to manage the one or more airside activities, wherein the airside activities comprise ground handling activities, and wherein determining time stamps associated with one or more of the ground handling activities of the aircraft comprises:
      identifying the aircraft and one or more ground handling vehicles by applying the video analytics on the obtained video data, wherein each of the one or more ground handling vehicles is associated with a ground handling activity:
   creating a bounding box around the identified aircraft and each of the one or more ground handling vehicles;
   tracking movements of at least one of the aircraft and the one or more ground handling vehicles using the created bounding boxes; and
   determining start and stop time stamps associated with the one or more of the ground handling activities based on distance between the aircraft and each of the one or more ground handling vehicles.

2. The method of claim 1, wherein the at least one video camera is arranged in the survey area of an airport such that the at least one video camera captures the video data of the aircraft from touchdown to takeoff.

3. The method of claim 1, wherein determining the start and stop time stamps associated with the one or more ground handling activities based on the distance between the aircraft and each of the one or more ground handling vehicles comprises:
   computing distance between a center of bounding box associated with the aircraft and a center of bounding box associated with each of the one or more ground handling vehicles; and
   determining the start and stop time stamps associated with the one or more ground handling activities based on the distance between the center of the bounding boxes associated with the aircraft and each of the one or more ground handling vehicles.

4. The method of claim 1, wherein the ground handling vehicles comprise a cargo van, a catering truck, a fuel truck, an airport sky bridge and an aircraft staircase.

5. The method of claim 1, wherein the ground handling activities comprise airport sky bridge movement, aircraft staircase movement, cargo activity, refueling activity and catering activity.

6. A method for airside activity management using video analytics, comprising:
   obtaining, in real time, video data of a survey area from at least one video camera; and
   determining time stamps associated with one or more airside activities of an aircraft from touchdown to takeoff by applying video analytics on the obtained video data to manage the one or more airside activities, wherein the airside activities comprise aircraft activities, and wherein determining time stamps associated with the aircraft activities by applying the video analytics on the obtained video data, comprises:
      identifying the aircraft and a runway by applying the video analytics on the obtained video data during landing and takeoff;

creating a bounding box around the identified aircraft and the runway;
tracking movements of the identified aircraft using the created bounding box;
computing distance between the bounding box associated with the aircraft and the bounding box associated with the runway; and
determining the time stamps associated with the aircraft activities based on the computed distance.

7. The method of claim 6, further comprising:
determining location information associated with the identified aircraft based on the obtained video data;
detecting a risk of collision of the aircraft in the identified runway based on the determined location information and time stamps; and
issuing an alert, in real-time, in response to detecting the risk of collision of the aircraft.

8. The method of claim 6, wherein the aircraft activities comprise aircraft touchdown and aircraft takeoff.

9. A system comprising:
at least one video camera; and
a computing system coupled to the at least one video camera, wherein the computing system comprises a video analytics tool to:
obtain, in real time, video data of a survey area from the at least one video camera; and
determine time stamps associated with one or more airside activities of an aircraft from touchdown to takeoff by applying video analytics on the obtained video data to manage the one or more airside activities, wherein the airside activities comprise ground handling activities, and wherein the video analytics tool is to:
identify the aircraft and one or more ground handling vehicles by applying the video analytics on the obtained video data, wherein each of the one or more ground handling vehicles is associated with a ground handling activity;
create a bounding box around the identified aircraft and each of the one or more ground handling vehicles;
track movements of at least one of the aircraft and the one or more ground handling vehicles using the created bounding boxes; and
determine start and stop time stamps associated with one or more of the ground handling activities based on distance between the aircraft and each of the one or more ground handling vehicles.

10. The system of claim 9, wherein the at least one video camera is arranged in the survey area of an airport such that the at least one video camera captures the video data of the aircraft from touchdown to takeoff.

11. The system of claim 9, wherein the video analytics tool is configured to:
compute distance between a center of bounding box associated with the aircraft and a center of bounding box associated with each of the one or more ground handling vehicles; and
determine the start and stop time stamps associated with the one or more ground handling activities based on the distance between the center of the bounding boxes associated with the aircraft and each of the one or more ground handling vehicles.

12. The system of claim 9, wherein the ground handling vehicles comprise a cargo van, a catering truck, a fuel truck, an airport sky bridge and an aircraft staircase.

13. The system of claim 9, wherein the ground handling activities comprise airport sky bridge movement, aircraft staircase movement, cargo activity, refueling activity and catering activity.

14. A system comprising:
at least one video camera; and
a computing system coupled to the at least one video camera, wherein the computing system comprises a video analytics tool to:
obtain, in real time, video data of a survey area from the at least one video camera; and
determine time stamps associated with one or more airside activities of an aircraft from touchdown to takeoff by applying video analytics on the obtained video data to manage the one or more airside activities, wherein the airside activities comprise aircraft activities, and wherein the video analytics tool is configured to:
identify the aircraft and a runway by applying the video analytics on the obtained video data during landing and takeoff;
create a bounding box around the identified aircraft and the runway;
track movements of the identified aircraft using the created bounding box;
compute distance between the bounding box associated with the aircraft and the bounding box associated with the runway; and
determine the time stamps associated with the aircraft activities based on the computed distance.

15. The system of claim 14, wherein the video analytics tool is further configured to:
determine location information associated with the identified aircraft based on the obtained video data;
detect a risk of collision of the aircraft in the identified runway based on the determined location information and time stamps; and
issue an alert, in real-time, in response to detecting the risk of collision of the aircraft.

16. The system of claim 14, wherein the aircraft activities comprise aircraft touchdown and aircraft takeoff.

17. A non-transitory computer readable storage medium including instructions that are configured, when executed by a computing device, for airside activity management using video analytics, the method comprising:
obtaining, in real time, video data of a survey area from at least one video camera; and
determining time stamps associated with one or more airside activities of an aircraft from touchdown to takeoff by applying video analytics on the obtained video data to manage the one or more airside activities, wherein the airside activities comprise ground handling activities, and wherein determining the time stamps associated with one or more of the ground handling activities of the aircraft comprises:
identify the aircraft and one or more ground handling vehicles by applying the video analytics on the obtained video data, wherein each of the one or more ground handling vehicles is associated with a ground handling activity;
create a bounding box around the identified aircraft and each of the one or more ground handling vehicles;
track movements of the at least one of the aircraft and the one or more ground handling vehicles using the created bounding boxes; and
determine start and stop time stamps associated with the one or more of the ground handling activities based on distance between the aircraft and each of the one or more ground handling vehicles.

18. The non-transitory computer readable storage medium of claim 17, wherein the at least one video camera is arranged in the survey area of an airport such that the at least one video camera captures the video data of the aircraft from touchdown to takeoff.

19. The non-transitory computer readable storage medium of claim 17, wherein determining the start and stop time stamps associated with the one or more ground handling activities based on the distance between the aircraft and each of the one or more ground handling vehicles comprises:
   computing distance between a center of bounding box associated with the aircraft and a center of bounding box associated with each of the one or more ground handling vehicles; and
   determining the start and stop time stamps associated with the one or more ground handling activities based on the distance between the center of the bounding boxes associated with the aircraft and each of the one or more ground handling vehicles.

20. The non-transitory computer readable storage medium of claim 17, wherein the ground handling vehicles comprise a cargo van, a catering truck, a fuel truck, an airport sky bridge and an aircraft staircase.

21. The non-transitory computer readable storage medium of claim 17, wherein the ground handling activities comprise airport sky bridge movement, aircraft staircase movement, cargo activity, refueling activity and catering activity.

22. A non-transitory computer readable storage medium including instructions that are configured, when executed by a computing device, for airside activity management using video analytics, the method comprising:
   obtaining, in real time, video data of a survey area from at least one video camera; and
   determining time stamps associated with one or more airside activities of an aircraft from touchdown to takeoff by applying video analytics on the obtained video data to manage the one or more airsick activities, wherein the airside activities comprise aircraft activities, and wherein determining time stamps associated with aircraft activities by applying video analytics on the obtained video data comprises:
      identifying the aircraft and a runway by applying the video analytics on the obtained video data during landing and takeoff;
      creating a bounding box around the identified aircraft and the runway;
      tracking movements of the identified aircraft using the created bounding box;
      computing distance between the bounding box associated with the aircraft and the bounding box associated with the runway; and
      determining the time stamps associated with the aircraft activities based on the computed distance.

23. The non-transitory computer readable storage medium of claim 22, further comprising:
   determining location information associated with the identified aircraft based on the obtained video data;
   detecting a risk of collision of the aircraft in the identified runway based on the determined location information and time stamps; and
   issuing an alert, in real-time, in response to detecting the risk of collision of the aircraft.

24. The non-transitory computer readable storage medium of claim 22, wherein the aircraft activities comprise aircraft touchdown and aircraft takeoff.

* * * * *